May 13, 1958
M. K. GEBERT ET AL
2,834,616
SHAFT SEALS
Filed March 29, 1955
2 Sheets-Sheet 1
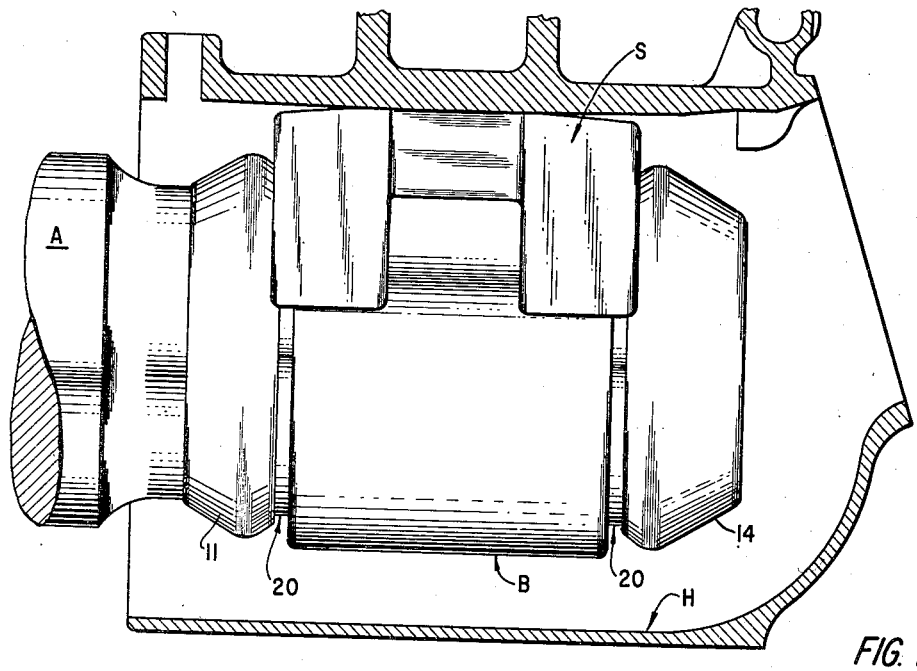
FIG. 1
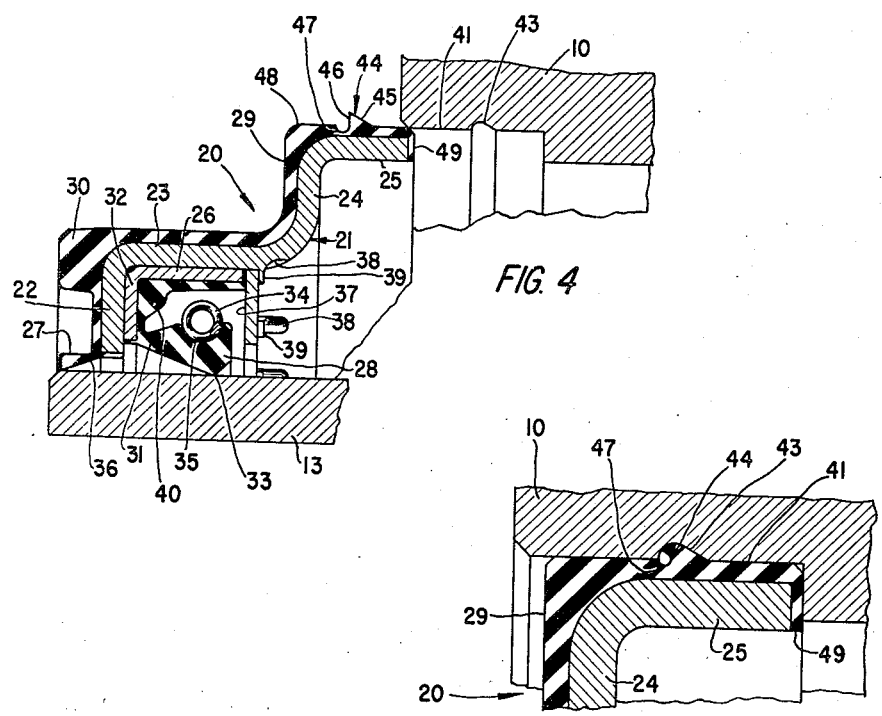
FIG. 4
FIG. 5

May 13, 1958  M. K. GEBERT ET AL  2,834,616
SHAFT SEALS
Filed March 29, 1955  2 Sheets-Sheet 2

United States Patent Office 2,834,616
Patented May 13, 1958

2,834,616

SHAFT SEALS

Marshall K. Gebert, San Carlos, and George E. Rich, Santa Clara, Calif., assignors, by mesne assignments, to Federal-Mogul-Bower Bearings, Inc., Detroit, Mich., a corporation of Michigan Application March 29, 1955, Serial No. 497,632

23 Claims. (Cl. 286—5)

This invention relates to shaft seals and more particularly to a unique construction especially adapted for prolonged duty under severe adverse conditions involving wide climatic fluctuations, wind driven sand, grit, water, etc., abusive shocks, and other harsh operating conditions customarily encountered in the operation of railway car trucks.

Many attempts have been made, without significant success, to provide a satisfactory seal for use on roller bearing assemblies designed for railway truck journals. There are many facets to the problem all of which must be satisfied by a commercially acceptable seal. These include a seal having a long trouble-free operating life, one which positively excludes water and grit of even a few microns in size, has a minimum of friction and torque loss, is equally effective at both low and high temperatures, positively retains lubricating mediums, is easily installed yet firmly locked in place in a fluid-tight manner, as well as one which will withstand abusive operating shocks and rough handling by service crews. These and other exacting requirements must be fulfilled by a simple and inexpensive structure occupying a minimum of space.

The present invention provides a seal incorporating numerous unique features and a highly satisfactory solution to a vexatious problem of long standing.

Accordingly, the primary object of this invention is the provision of a unitary shaft type seal capable of excluding foreign matter from and retaining lubricant within a shaft and housing assembly wherein the shaft may and usually is subjected to random axial movement.

Another object is the provision of a novel sealing device for use between the inner and outer raceways of a cylindrical roller type anti-friction bearing unit.

Yet another object is the provision of a simplified seal construction having a pair of sealing lips each specially designed for optimum efficiency in performing a different task.

A further object is the provision of a novel self-locking feature for holding a shaft seal positively in place in its mounting bore.

More specifically, it is an object of the invention to provide a seal adapted to be installed in a housing bore under a much smaller force than that required to remove the same.

Yet another object is the provision of a seal having a sealing lip located externally of its casing and safeguarded by a concentric ring of the same resilient material as the lip.

Another object is the provision of a seal construction embodying two cupped casings nested together and having resilient sealing lips bonded to the inner and outer radial faces of the nested casings. Included as a feature of the construction is the locking of the casings in assembled position by swaging metal from the inner side of the outer casing over the corner of the inner casing assembly.

Numerous other features and advantages of the invention will become apparent from the following detailed specification of an illustrative embodiment taken in connection with the accompanying drawings, wherein:

Figure 1 is a longitudinal sectional view through a railway truck journal housing showing the exterior of an anti-friction bearing assembly incorporating the present invention;

Figure 4 is an enlarged sectional view through a sealing device in readiness for pressing into its mounting bore; and Figure 5 is a fragmentary view on a still larger scale showing the seal virtually locked in its installed position.

Figure 2:
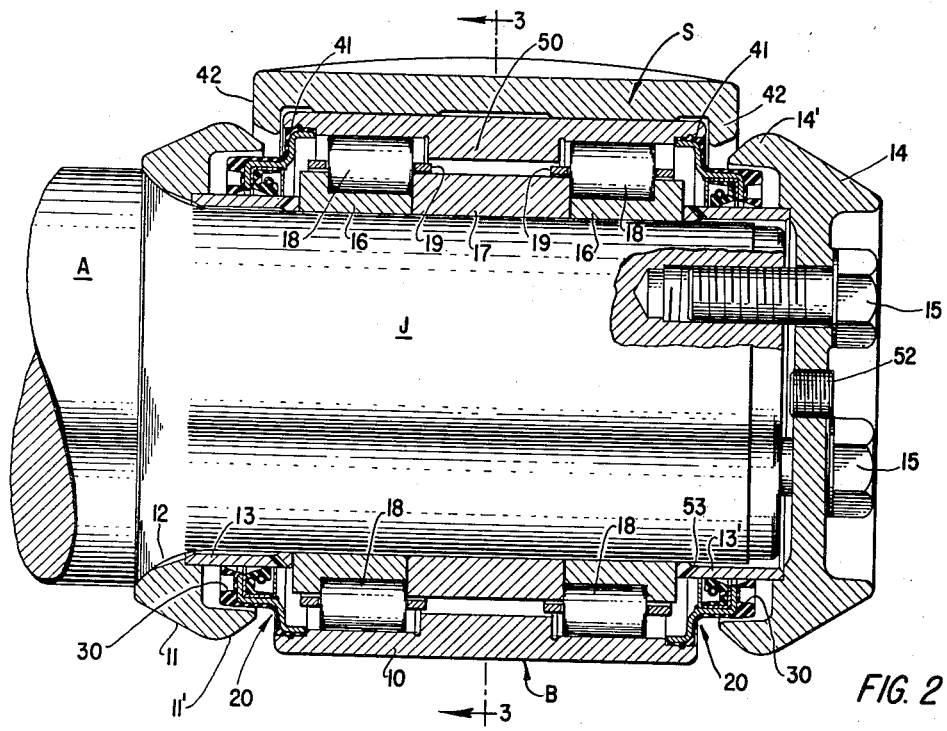
Figure 2 is a longitudinal sectional view through the bearing assembly and the sealing devices employed therein.

Referring now to the drawings, and more particularly to Figures 1 and 2, it will be seen that the invention, as shown, is incorporated in a cylindrical roller type anti-friction bearing of a type especially designed for use on railway trucks. More particularly, the anti-friction bearing to be described is designed for use in converting railway trucks employing sleeve bearings to roller bearing operation. The lubricant and foreign matter sealing requirements of such bearings have been so numerous, diverse and exacting as to defy the efforts, ingenuity and talents of designers for many years. Exhaustive tests have demonstrated that the present design fulfills these many requirements in a highly satisfactory manner and to a degree never before approached.

It will be understood that the truck axle A projects from the outer face of the truck wheel, not shown, and terminates in a trunnion-like journal J. The cartridge-like anti-friction bearing assembly B completely encloses the journal and is secured thereto in a manner which will be described presently. The journal and its bearing assembly projects through the open rear end of a housing H at the end of the usual truck side frame, not shown. Interposed between the top of housing H and bearing assembly B is a crescent-like saddle S. The car body proper is supported in conventional manner by the side frames which in turn transfer the weight to axle A by way of housing H and saddle S.

Figure 3:
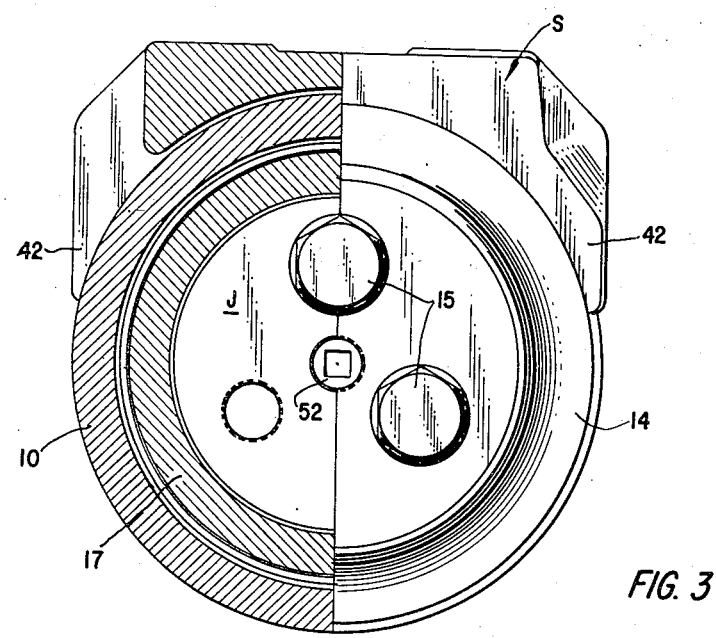
Figure 3 is a view taken in part from the right hand end of Figure 2 and, in part, in section along line 3—3 on Figure 2.

The roller bearing assembly comprises an outer cylindrical raceway 10 arranged concentrically about an inner raceway consisting of a series of rings arranged edge-to-edge along journal J. Thus, the innermost guard ring 11 is seated against the outer rim of fillet 12 of the journal. Abutting a shoulder on the interior shouldered rim of guard ring 11 is a seal seating sleeve 13. An identical seal seating ring 13' surrounds the outer end of the journal and projects slightly beyond the end thereof in abutment with cap plate 14. The latter is secured to the end of the journal by means of heavy-duty cap screws 15 in the manner made clear by Figures 2 and 3. Held clamped under axial compression between seal seating rings 13, 13' is a pair of case-hardened flanged rings 16, 16, separated by a spacer ring 17.

Two rings of precision cylindrical roller bearing elements 18, 18 are arranged between inner raceway rings 16, 16 and the outer raceway 10, the elements in each ring being held spaced from one another by the usual separator band 19. It will also be noted that flanged rings 16 cooperate with spacer ring 17 to hold roller elements 18 against axial displacement.

The lubricant and dust sealing devices for sealing the annular gap between the outer race 10 and the inner race at either end of the bearing assembly are generally designated 20. Preferably, the sealing devices are of identical construction in the interest of greater economy and manufacture, ease of handling, avoidance of error in installation, etc.

The outer cupped casing 21, stamped from heavy gauge sheet steel material, includes a radially disposed flange 22 at its outer end, a small diameter cylindrical section 23, a second radially disposed ring 24, and a large diameter cylindrical mounting rim 25. A second cupped casing 26, stamped from lighter gauge steel material, nests with a snug fit against the inner side of wall 23 of the outer casing in the manner clearly shown in Figure 4.

The sealing lips are preferably formed from suitable resilient elastomeric material having a high resistance to attack by lubricating mediums. There are a number of such materials commercially available on the market such as the synthetic Buna-N type rubber compounds. Experience has demonstrated that certain compositions give superior results in operation on a dry or semi-dry rotating surface and in an atmosphere contaminated with dust, dirt and other foreign matter. Sealing lips made for such use may be designated as dry running, and the compounds from which they are made as dry running compounds. Other variations of these compounds give poor results under these operating conditions but highly superior results when operating against a clean well-lubricated rotating surface. These will be referred to herein as moist running compounds. The present construction enables us to take advantage of these characteristics of known synthetic elastomers. Thus, the outwardly facing thin-walled sleeve-like dust lip 27 is formed of a dry running elastomer having long life operating in a dirty atmosphere with a minimum of lubrication, while inner lip 28, operating in a clean atmosphere and against the lubricated surface of seating ring 13, is made of a moist running elastomer.

Lips 27 and 28 are preferably bonded to the inner rims of cases 21 and 26 respectively. While it is not essential that the bonded connection extend beyond the inner rim of the rigid supporting members, there are certain advantages in coating the remote faces of the nested casing rings with a layer of this material. As herein illustrated, a relatively thin layer of elastomer is bonded to the entire exterior surface of casing 21. Included in this covering layer is a heavy-duty buffer or guard ring 30.

Guard ring 30 has a thickness or axial extent at least as great as that of dust sealing lip 27 and has several important functions. Among these is that of protecting lip 27 against damage prior to the assembly of sealing device within its supporting bore. For example, the sealing device may be supported on its bottom end after manufacture without liability of crushing, distorting or otherwise damaging the thin-walled dust lip. Likewise, the sealing devices may be compactly nested during shipping and storage without liability of damage to the dust lip, or the need for special packaging separators. But perhaps of greater importance is the function of ring 30 in protecting the dust lip after installation for reasons which will be better understood at a later point in this disclosure.

Lubricant sealing lip 28 can also be described as a generally sleeve-like or cylindrical member having a thin flex section 31 located closely adjacent its point of anchorage to the rim of radial flange 32 of inner casing 26. Its inner side comprises a pair of oppositely inclined walls merging in the sharp sealing lip 33 remotely from the flex section. A conventional type garter spring 34 is seated in a retaining groove 35 formed in the outer wall of lip 28 generally opposite lip 33 but offset slightly toward the flex section. During manufacture, lip 28 is trimmed so that the free unstressed diameter of sealing edge 33 is substantially identical with that of the surface of seal seating ring 13. However, spring 34 is so designed that when in place on the lip, the diameter of edge 33 prior to assembly on a seating surface is reduced by as little as 0.050 to 0.060 inch. It will, therefore, be clear that when installed on ring 13, the lip will be under very light pressure and this pressure will preferably be attributable solely to spring 34.

As noted above, dust lip 27 employs no spring or other mechanical means for biasing it into contact with the seating ring. There are several reasons for this. Among these is the fact that highly superior results have been obtained employing an unusually thin-walled lip of short axial length and having a thin flex section 36. The impracticability of using a spring bias on such a short and thin sectioned lip of large diameter is obvious. It has also been found that the sealing edge should have an initial diameter of .010–.015 inch less than that of seating ring 13. This slight amount of interference suffices to provide adequate sealing contact without, however, distorting the sealing edge of the lip or generating destructive heat or producing objectionable wear on either the lip or the seating surface. Yet, the contact thus provided is highly efficient in excluding even the finest particles of dust and grit from the bearing chamber as well as exceptionally long-lived.

It will be noted from Figure 4 that the inner radial and axial walls of case 26 are covered by a layer of the elastomeric stock which, as is true of outer case 21, even extends across the rim edges of both flanges. Not only does this assure a protective coating for the case, but it simplifies the molding and bonding operation. Furthermore, the layer of rubber across the flange edges provides gaskets between case 26 and the interior surfaces of outer casing 21.

Assembly of the seal is accomplished merely by pressing inner case 26 into the small diameter end of outer case 21. The contacting surfaces of the cases are held to close tolerances to provide a press fit between the outer rims of the cases with the rubber covered edges of the inner case flanges gasketed against the walls of the outer case. Thereafter, a keeper washer 37 is inserted and staked in position. This operation is accomplished by placing the seal in a staking press having a plurality of appropriately shaped plungers arranged in a circle so as to strike or gouge out portions of the inner wall of casing 21 and swage them inwardly over the outer edge of washer 37 as indicated at 38 and 39 in Figure 4. Burrs or stakings 39 are spaced at short intervals along the rim of the washer. Note that the burrs are struck out entirely from the inner wall of case 21 and without deforming or upsetting the heavy wall of the case itself by a spinning or dinking operation. Such deformation is not feasible with the heavy case construction required in the present seal application for various reasons including the expensive tooling required and the likelihood of damaging or deforming the inner case. Staking of washer 37 deforms the rubber gasket at the casing edges sufficiently to provide additional assurance of a fluid-tight seal at these points, holds the inner case accurately assembled and positioned and prevents dislodgment of spring 34.

To be noted at this point is the relationship of spring 34 to the surrounding structure which is so designed that the spring cannot become displaced except momentarily from retaining groove 35 whereupon it is automatically restored to the seating groove. This is the reason for the thickened layer or ring of rubber 40 in the corner of case 26 preventing the spring from becoming lodged behind flex section 31. Washer 37 also prevents loss of the spring over the free rim of the lip.

The means for holding sealing rings 20 positively assembled with the bearing assembly includes a deep cylindrical bore 41 formed in the opposite ends of outer raceway 10. The depth of the bore is slightly greater than the axial length of the larger diameter portion of the casing in order that radial wall 24 of the case and its covering layer 29 will be located inside the end rim of the raceway. The reason for this will be made evident by Figure 2 from which it will be seen that saddle S straddling the upper side of the bearing is provided with heavy-duty inturned thrust flanges 42, 42 overhanging the opposite ends of the raceway. There is sufficient clearance between the inner walls of these flanges and the rims of the raceway to permit free assembly and very slight limited movement. Obviously, it is important that the resilient material covering radial flange 24 of the outer case be protected from the powerful axial forces acting on saddle S and absorbed by the end of outer raceway 10 and its associated bearing parts.

The side wall of bore 41 is provided with a continuous channel or groove 43 of the contour shown in Figure 4, or other suitable shape depending upon the contour of the cooperating bead or detent on the rim of the oil seal. A preferred contour for detent 44 is that shown in Figure 4. This annular detent, integral with resilient layer 29, comprises an inclined leading edge 45 and a virtually radial wall 46 on its trailing side. Wall 46 merges with or lies in common with the side wall of annular groove 47 formed in layer 29. Note that grooves 47 lie below cylindrical mounting surface 48 of layer 29, whereas detent 44 projects above this surface. Cylindrical surface 48 of resilient layer 29 has a diameter very slightly greater than that of bore 41. As a result, the seal can be nested into the bore with relatively small effort and without placing the resilient covering layer under any substantial pressure.

The entrance end of the bore and the leading edge of the seal casing are preferably beveled to provide a pilot facilitating the assembly of the seal into the bore. The beveled entrance to the bore also acts to depress detent 44 into groove 47 immediately therebehind. Once the seal has been pressed fully into the bore, detent 44 will be opposite groove 43 and will snap into and substantially fill this groove as best shown in Figure 5. The ridge edge of the detent will be deformed slightly and a portion of its body may actually be depressed into groove 47. Hence, it will be readily apparent that the detent will be under much greater compression pressure than the adjacent portions of resilient layers 29. Also, the gasketing layer 49 overlying the inner end of casing flange 25 will be held firmly sealed against the base of bore 41.

Any forces applied to the seal casing in a direction to remove it from the bore will be resisted by a detent 44 and groove 43. The shape of these elements is such that any forces tending to displace the seal from the bore places detent 44 under axial compression acting in a direction toward gasket 49 and with only a slight tendency to depress the rubber into groove 47. In fact, many times as much force is required to dislodge the seal from the bore as was required to install it initially. Yet, while installed, so little resilient material is under compression that there is no noticeable tendency of the rubber to cold-flow or shrink out of sealing contact with the bore walls. Moreover, the large surface area of resilient material in contact with the rough or semi-finished bore walls is many times the torque load acting on the lightly pressed sealing lips 27 and 28 and fully adequate to safeguard the seal against rotation within its mounting bore.

A few features of the construction remain to be identified. These will be best understood by reference to Figure 2. Thus, in the fully installed position of the sealing device its entire small diameter portion, including lips 27 and 28, are located beyond the ends of the bearing raceway rings 10 and 16, while its large diameter mounting rim 25, as well as its radial flange 24 and covering layer 29, is located inside the ends of outer raceway 10. In the first place, this stepped construction provides an extremely strong and rugged support for the sealing lips. Also, by this expedient, the axial length of the high precision and costly bearing raceways can be held to a minimum without imposing restrictions on the design of a rugged and highly efficient dust and lubricant seal.

In the type of bearing herein disclosed, the truck journal J and the entire inner raceway structure is axially movable a considerable distance with respect to the outer raceway. It follows that the sealing lips are constantly shifting axially across the surfaces of seating rings 13, 13'. In the structure here illustrated, the magnitude of this shifting is indicated by the distance between the ends of roller elements 18 and the adjacent rim edges of thrust ring 50 formed on the inner central portion of raceway 10. The construction illustrated not only makes adequate provision for this shifting but also includes full protection for the seal even though it is partially exposed due to the gap between the relatively moving parts. This protection is provided in part by the overhanging inwardly projecting rims 11' and 14' encircling the sealing lip portions of the sealing devices and aid greatly in protecting them from injury. Supplementing rims 11' and 14' in protecting the sealing devices is the resilient guard ring 30 bonded to the radial end wall of the seal casings concentrically with dust lip 27. Rings 30 are more or less fully exposed at either extreme by the axial shifting of the bearing raceways. When this occurs, rings 30 exclude most of the dust and foreign matter which would otherwise impinge upon dust lip 27 and its sealing surface. Needless to say, the exclusion of such matter from the immediate vicinity of the lip and its highly polished seating surface is highly desirable. Moreover, ring 30 serves to prevent inexperienced service personnel from extending prods or tools into contact with the dust lip through gap between rims 11', 14' and end wall of the seal cases.

A detailed but nevertheless functionally important aspect of the lip design is clearly shown in Figure 4. Reference is had to the different diameters of the inner peripheries of casing flanges 22 and 32. These diameters are commonly known in this art as the pierce diameters since they are customarily formed by punching or piercing a slug from sheet metal. In the present instance, the pierce diameter for outer flange 22 is somewhat smaller than that for inner flange 32. Were it not for these differential diameters it would not be feasible to locate the flex sections of the two lips at the respective optimum distances from the seating surface on ring 13. And for like reasons, it would not be convenient to have the longer inner wall of both lips form substantially the same angle with ring 13. However, with the present design it is a simple matter to mold each lip independently of the other using a different elastomer for each and securing each to a case having the exact size of pierce most suitable to the particular lip. In the present design, the smaller diameter pierce in flange 22 is appropriate for the axially short flex section of dust lip 27, while the larger opening of flange 32 is appropriate for the axially long flex section of sealing lip 28.

Still another feature is the provision for fully charging the bearing assembly with lubricant after final assembly on the journal. This is accomplished by moving the filling plug 52 in the center of end cap 14 and attaching a pressurized lubricant supply duct. Lubricant can then be forced into the narrow space between the end cap and the end of the journal, axially along the narrow space between seating ring 13' and the journal wall, through openings 53 in the seating ring and into the annular space between the raceways. The lubricant cannot escape from this chamber because of the presence of the sealing devices 20 and the fact that the rear end of the bearing assembly seals against the rim of fillet 12 through guard ring 11. Upon fully charging with lubricant, plug 52 is replaced.

While only a single embodiment of the invention has been specifically disclosed, it will be quite apparent that the essential features may be constructed in many different ways or employed in seal applications differing widely from those discussed above. In particular, it is to be understood that the various novel aspects of the invention may be utilized individually or in various combinations thereof if this should be found desirable in meeting the requirements of a specific problem. Moreover, while the sealing device disclosed in detail is especially effective for railway truck anti-friction bearings, manifestly it is

We claim:

1. A shaft seal assembly for use in excluding dirt from a bearing chamber while preventing the escape of lubricant therefrom, said assembly comprising inner and outer cupped rings of rigid material formed to nest snugly one within the other, each ring having a radial wall with an inner face and outer face, an outwardly flaring sealing lip of resilient material bonded to the outer face of the radial wall of said outer ring, an oppositely flaring sealing lip of resilient material bonded to the inner face of the radial wall of said inner ring, means for holding said rings nested together in a fluid-tight manner, and means on the outer periphery of said outer ring for securing said shaft seal assembly to a bearing chamber with said resilient lips seated against a cylindrical relatively rotating surface.

2. A shaft seal assembly comprising a pair of rigid ring elements, one of said ring elements being cupped to provide a radial wall and an axial wall integral therewith, the second of said ring elements being adapted to nest snugly within the axial wall of said cupped ring element, the outer face of said radial wall having a resilient thin-walled annular sealing lip bonded thereto and projecting axially away from the interior of said cupped ring element, said second ring element having a resilient annular spring-biased sealing lip bonded thereto and projecting axially in the opposite direction from said first mentioned lip, and means for holding said ring elements nested together.

3. A shaft seal as defined in claim 2 including a third rigid ring element adapted to nest within the axial wall of said cupped ring element after said second ring element has been assembled therewithin, said third rigid ring element having a rim edge, the aforesaid means for holding said ring elements nested together comprising interior circumferentially spaced portions of the axial wall of said cupped ring element swaged radially inward over the rim edge of said third ring element.

4. A shaft seal as defined in claim 2 wherein the outer faces of said radial and axial walls of said cupped ring element are covered by a thin layer of resilient material bonded thereto, said layer including lip protective means spaced radially from said thin-walled lip and of substantially the same axial dimensions as said thin-walled lip.

5. A shaft seal comprising, an outer metal ring having a stepped sidewall, including a larger diameter axial wall, a smaller diameter axial wall, a radial web connecting said axial walls, and a flange radially inturned from the end of said smaller diameter axial wall, said walls each having an inner face and an outer face, a layer of resilient synthetic elastomer bonded to the outer faces of said ring including an annular thin-walled sealing lip projecting axially from the outer face and the radially inner periphery of said inturned flange, a cupped inner ring having an outer face nested snugly against the inner face of said smaller diameter axial wall of said outer ring and having an inner face, a second resilient annular sealing lip of oil resistant synthetic elastomer bonded to the inner face of said cupped ring and extending in the opposite axial direction from said first mentioned lip, said cupped ring being held in assembled position within said outer ring by portions of the inner face of the outer ring swaged radially inwardly over the adjacent portion of the inner cup to press the latter firmly against said inturned flange.

6. A shaft seal as defined in claim 5 including a circumferentially extending bead of resilient material projecting radially from the outer surface of the elastomer on the larger diameter axial wall of said outer ring, said layer of elastomer also having a shallow circumferential groove formed therein immediately beside the edge of said bead on the side thereof nearer said radial web.

7. A shaft seal having a deformable bead of resilient material for locking the same in the grooved bore of a housing wall, said seal having a reinforcing ring provided with a wide cylindrical outer peripheral portion having a leading edge and a trailing edge and an inner surface and an outer surface, a thin layer of resilient material bonded to said outer surface from the leading to the trailing edges thereof, said layer including an elongated circumferential bead projecting radially beyond and a circumferential trough in the surface of said layer, said trough being located closely beside said bead and on the side thereof opposite the leading edge of said cylindrical peripheral portion whereby when said leading edge is pressed into a housing bore having a grooved side wall, said bead is depressed into said trough until free to rebound into the groove in the bore side wall.

8. A shaft seal as defined in claim 7 and wherein said bead has a leading face inclining radially outwardly and axially backwardly toward the trailing edge of said cylindrical peripheral portion and providing a pilot cooperable with the entrance edge of a housing bore to depress the bead into said trough as the seal is being assembled into a housing bore.

9. A shaft seal as defined in claim 7 wherein said bead has a generally radial sidewall bordering said trough and an inclined frusto-conical sidewall along the opposite axial side thereof acting as a pilot to facilitate the assembly of said seal into a housing bore.

10. In an anti-friction bearing assembly of the type having inner and outer concentrically arranged raceway means held separated by a ring of circular anti-friction elements, said outer raceway having an axial bore in the end thereof provided with an elongated groove extending circumferentially along the side wall of the bore; that improvement which comprises a lubricant sealing device adapted to seat within said bore for the purpose of excluding foreign matter from the space between said raceway means while restraining lubricant against escape therefrom, said device including a cupped ring having a thin layer of synthetic rubber bonded to its outer sidewall and a resilient annular sealing lip secured to the inner periphery of said cupped ring, said layer of rubber having an elongated bead projecting above its generally cylindrical surface adapted to seat within the groove in the side wall of said axial bore when the sealing device is in its installed position therein, and a recess adjacent one side of said bead into which the bead can be depressed as the sealing device is being nested into said bore during installation and until said bead reaches a position radially opposite the groove.

11. In an anti-friction bearing assembly of the type having inner and outer concentrically arranged raceway means held separated by a ring of anti-friction elements, said outer raceway having an axial bore in the opposite ends thereof each of which has an annular shallow groove in its side wall to receive the beaded rim of a sealing device seated within said bore; that improvement which comprises a dust and lubricant sealing device nested and locked within said bores for sealing the annular gap between said raceways, said sealing device including a cupped casing having a radially flanged end and a cylindrical sidewall adapted to telescope into the bore at the end of said raceway in a fluid-tight manner, sealing lip means secured to the inner and outer sides of said radially flanged end for excluding foreign matter therefrom while retaining lubricant within said bearing assembly and including a pair of readily flexible ring-like sealing members projecting in opposite axial directions from an anchorage associated with the inner rim of said radial flange, and a thin layer of resilient material bonded to the exterior sidewall of said cupped casing including a corrugation partly above and partly below the surface thereof, the part of said corrugation above the surface being deformable into an adjacent portion of the corrugation during installation of the seal into said bore and adapted to seat in the groove in the bore sidewall to lock the sealing device in assembled position with said sealing lips resiliently seated against the surface of said inner raceway means.

12. The combination defined in claim 11 wherein said cupped casing for said sealing device has a stepped sidewall of different diameters to increase the rigidity thereof, said sealing lips being located at the small diameter end thereof and axially beyond the end of said outer raceway.

13. The combination defined in claim 11 including guard means for the outer one of said sealing lips, said guard means being carried by the radially flanged end of said casing and projecting axially beyond the outer surface thereof a distance at least as great as the axial projection of said one lip.

14. A shaft seal comprising a cupped metal casing having a cylindrical side wall with an outer rim and an inner face and an outer face and adapted to be pressed into a housing bore concentric with a rotating member extending therethrough, said casing having a radially inwardly extending side wall with an inner rim, the outer face of said casing having resilient synthetic material bonded thereto including a thin layer on the cylindrical side wall portion adapted to seat within a housing bore, an annular sealing lip projecting axially from said inner rim in a direction away from the free edge of said outer rim, and a guard ring of synthetic material having a radial face substantially concentric with and spaced radially outside said sealing lip, said guard ring being of somewhat greater axial length than said sealing lip, thereby serving to protect the same from damage as well as providing a resilient buffer on the outer endwall of said seal.

15. In a railway truck journal bearing assembly of the type having a roller bearing assembly interposed between the journal and the truck sideframe, said assembly including outer and inner concentric raceway means separated by two rings of cylindrical roller bearings arranged to permit limited relative axial movement of said raceways, means securing the inner raceway means to the journal, means for supporting the outer raceway stationarily in the truck side frame; that improvement which comprises a sealing device stationarily nested in the opposite ends of said outer raceway with its inner periphery forming a dust and fluid-tight running seal with the opposite ends of said inner raceway, each of said sealing devices including a cupped metal casing having its outer rim edge frictionally nested in an end of said outer raceway and its inner rim closely spaced from the cylindrical outer surface of said inner raceway means in a plane substantially beyond the end of the outer raceway, a pair of resilient thin-walled annular sealing lips projecting axially in opposite directions from said inner rim and seated upon said cylindrical surface under slight pressure, and means on the inwardly facing lip for augmenting the seating pressure of said lip.

16. The combination defined in claim 15 wherein said sealing lips comprise separate sleeve-like synthetic rubber members having their adjacent ends bonded to the inner rim of said cupped casing means, the opposite remote ends of said sleeves having radially inwardly directed sealing lip portions, the outwardly facing one of which acts to exclude foreign matter and the other of which seals lubricant within said bearing assembly.

17. The combination defined in claim 16 including a ring carried by said cupped casing means radially spaced from and concentric with said outwardly facing lip for deflecting foreign matter therefrom and safeguarding the same against injury.

18. A shaft seal comprising two cupped casings adapted to nest snugly together with the outer surface of the inner casing pressed against the inner surface of the outer casing in a fluid-tight manner, said casings having abutting radially extending walls each terminating in a rim edge, synthetic elastomeric material bonded to the outer face of the outer casing and the inner face of the inner casing including sleeve-like sealing lip rings projecting in opposite axial directions from the adjacent rim edges of each of said casings, and means on the other rim of at least one of said casings for supporting said shaft seal concentrically with respect to a relatively rotating surface adapted to have sealing contact with said sleeve-like sealing lip rings.

19. A shaft seal as defined in claim 18 wherein one of said sealing lip rings is thin-walled throughout its axial width with its thinnest section adjacent its connection to said casing rim and its sealing edge adjacent the outer free edge thereof, and wherein the other sealing lip ring has its thinnest section adjacent its connection to its supporting casing and its sealing edge remote therefrom and biased toward a relatively rotating surface by spring means bearing thereagainst.

20. A shaft seal adapted to be pressed into a grooved housing bore with slight effort and to automatically interlock therewith, said seal comprising a metal reinforcing ring having a radially disposed wall whose radially inner end constitutes the inner periphery of said ring, and a radially outer cylindrical wall of slightly smaller diameter than the housing bore for which said seal is designed, said ring walls having an inner and an outer surface, a resilient sealing member bonded to said outer surface of both said walls to provide an axial portion and a radial portion, said resilient sealing member including an annular sealing lip secured to and of smaller diameter than the inner periphery of said reinforcing ring and adapted to form a fluid-tight seal with a relatively rotating member, said sealing member having an axial portion with an elongated circumferential bead and circumferential trough with a common side wall, whereby, when said seal is pressed into a housing bore with said bead foremost, the entrance edge of the bore depresses the bead into said trough until the bead is opposite the bead-receiving groove in the bore wall whereupon the bead is free to snap into the groove and lock the seal in assembled position.

21. A shaft seal assembly comprising a pair of rigid cupped rings nested together, each ring having a cylindrical portion and a radial portion, each portion having an inner face and an outer face with the outer face of the inner ring abutting the inner face of the outer ring, said radial portions having inner peripheries of a different diameter from each other, that of the outer ring having the smaller periphery; a relatively short sleeve-like annular sealing lip of resilient material having one end rim secured to the outer face of the radial portion of the outer ring and a relatively long sleeve-like annular sealing lip of resilient material having one end rim secured to the inner face of the radial portion of the inner ring.

22. A shaft seal assembly as defined in claim 21 wherein said lips project axially outwardly away from each other and from the abutting faces of said rigid rings.

23. A shaft seal assembly as defined in claim 22 wherein each of said lips is made from a different elastomeric compound.

References Cited in the file of this patent

UNITED STATES PATENTS

| Number | Name | Date |
| --- | --- | --- |
| 1,918,121 | Mulhern | July 11, 1933 |
| 1,982,729 | Eberhard | Dec. 4, 1934 |
| 2,049,366 | Gardner | July 28, 1936 |
| 2,102,013 | Leonard | Dec. 14, 1937 |
| 2,172,325 | Victor et al. | Sept. 5, 1939 |
| 2,202,944 | Boyd | June 4, 1940 |
| 2,208,482 | Victor | July 16, 1940 |
| 2,208,620 | Baisch | July 23, 1940 |
| 2,212,291 | Heinze et al. | Aug. 20, 1940 |
| 2,434,686 | Clayton-Wright | Jan. 20, 1948 |
| 2,522,231 | Loftis | Sept. 12, 1950 |
| 2,651,534 | Kosatka | Sept. 8, 1953 |
| 2,695,801 | Kosatka | Nov. 30, 1954 |
| 2,760,802 | Haley | Aug. 28, 1956 |